(12) United States Patent
Vadlamani et al.

(10) Patent No.: US 8,150,859 B2
(45) Date of Patent: *Apr. 3, 2012

(54) SEMANTIC TABLE OF CONTENTS FOR SEARCH RESULTS

(75) Inventors: Viswanath Vadlamani, Redmond, WA (US); Abhinai Srivastava, Seattle, WA (US); Tarek Najm, Kirkland, WA (US); Arungunram Chandrasekaran Surendran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/701,338

(22) Filed: Feb. 5, 2010

(65) Prior Publication Data

US 2011/0196875 A1 Aug. 11, 2011

(51) Int. Cl.
*G06F 17/30* (2006.01)
(52) U.S. Cl. ....................................................... 707/748
(58) Field of Classification Search .................. 707/738, 707/748
See application file for complete search history.

(56) References Cited

U.S. PATENT DOCUMENTS

| | | | |
|---|---|---|---|
| 5,835,087 A | 11/1998 | Herz et al. | |
| 6,038,560 A | 3/2000 | Wical | |
| 6,167,368 A * | 12/2000 | Wacholder | 704/9 |
| 6,363,378 B1 | 3/2002 | Conklin et al. | |
| 6,460,034 B1 | 10/2002 | Wical | |
| 6,473,730 B1 * | 10/2002 | McKeown et al. | 704/9 |
| 6,510,406 B1 | 1/2003 | Marchisio | |
| 6,567,805 B1 | 5/2003 | Johnson et al. | |
| 6,675,159 B1 | 1/2004 | Lin et al. | |
| 6,871,202 B2 | 3/2005 | Broder | |
| 6,886,010 B2 * | 4/2005 | Kostoff | 1/1 |
| 7,089,226 B1 | 8/2006 | Dumais et al. | |
| 7,152,031 B1 | 12/2006 | Jensen et al. | |
| 7,153,137 B2 | 12/2006 | Altenhofen et al. | |

(Continued)

FOREIGN PATENT DOCUMENTS

JP 2009252145 10/2009

(Continued)

OTHER PUBLICATIONS

Wartena, Christian, et al., Topic Detection by Clustering Keywords—Published Date: Sep. 5, 2008 http://www.uni-weimar.de/medien/webis/research/workshopseries/tir-08/proceedings/18_paper_655.pdf.

(Continued)

*Primary Examiner* — James Trujillo
*Assistant Examiner* — Jorge A Casanova
(74) *Attorney, Agent, or Firm* — Shook, Hardy & Bacon LLP

(57) ABSTRACT

A table of contents is generated for search results in response to a search query by identifying semantic concepts as topics for inclusion within the table of contents. When a search query is received, a search is performed to identify search results. The search results are compared to an ontology of topics to identify relevant topics. Additionally, search results are compared to an ontology of partial topics to identify relevant partial topics, which are named. Independent key-phrases are further generated from search results and identified as key-phrase topics. The identified topics, named partial topics, and key-phrase topics are ranked, and topics are selected for inclusion within a table of contents. A search results page is returned in response to the search query that includes search results and the generated table of contents.

18 Claims, 7 Drawing Sheets

U.S. PATENT DOCUMENTS

| | | | |
|---|---|---|---|
| 7,167,866 B2 | 1/2007 | Farnham | |
| 7,225,407 B2 | 5/2007 | Sommerer et al. | |
| 7,275,061 B1 | 9/2007 | Kon et al. | |
| 7,426,507 B1* | 9/2008 | Patterson | 1/1 |
| 7,448,047 B2 | 11/2008 | Poole | |
| 7,496,830 B2 | 2/2009 | Rubin et al. | |
| 7,536,408 B2* | 5/2009 | Patterson | 1/1 |
| 7,565,627 B2 | 7/2009 | Brill et al. | |
| 7,577,646 B2 | 8/2009 | Chien et al. | |
| 7,580,921 B2* | 8/2009 | Patterson | 1/1 |
| 7,617,176 B2* | 11/2009 | Zeng et al. | 1/1 |
| 7,668,813 B2 | 2/2010 | Baeza-Yates | |
| 7,707,201 B2 | 4/2010 | Kapur et al. | |
| 7,809,717 B1 | 10/2010 | Hoeber et al. | |
| 7,809,719 B2* | 10/2010 | Furuuchi et al. | 707/723 |
| 7,996,440 B2* | 8/2011 | Probst et al. | 707/803 |
| 8,010,344 B2* | 8/2011 | Zhang | 704/10 |
| 8,051,104 B2 | 11/2011 | Weissman et al. | |
| 2003/0078913 A1 | 4/2003 | McGreevy | |
| 2003/0177112 A1 | 9/2003 | Gardner | |
| 2003/0217052 A1 | 11/2003 | Rubenczyk et al. | |
| 2004/0003351 A1 | 1/2004 | Sommerer et al. | |
| 2004/0015483 A1 | 1/2004 | Hogan | |
| 2004/0030741 A1 | 2/2004 | Wolton et al. | |
| 2004/0169688 A1 | 9/2004 | Burdick et al. | |
| 2005/0022114 A1 | 1/2005 | Shanahan et al. | |
| 2005/0055341 A1 | 3/2005 | Haahr | |
| 2005/0080775 A1 | 4/2005 | Colledge et al. | |
| 2005/0125219 A1 | 6/2005 | Dymetman et al. | |
| 2005/0132297 A1 | 6/2005 | Milic-Frayling et al. | |
| 2005/0149510 A1 | 7/2005 | Shafrir | |
| 2006/0004732 A1 | 1/2006 | Odom | |
| 2006/0005156 A1 | 1/2006 | Korpipaa et al. | |
| 2006/0047691 A1 | 3/2006 | Humphreys et al. | |
| 2006/0069589 A1 | 3/2006 | Nigam et al. | |
| 2006/0069617 A1 | 3/2006 | Milener | |
| 2006/0106793 A1 | 5/2006 | Liang | |
| 2006/0116994 A1 | 6/2006 | Jonker et al. | |
| 2006/0117002 A1 | 6/2006 | Swen | |
| 2006/0242147 A1 | 10/2006 | Gehrking | |
| 2006/0287919 A1 | 12/2006 | Rubens | |
| 2006/0287983 A1 | 12/2006 | Krauss et al. | |
| 2007/0094256 A1 | 4/2007 | Hite et al. | |
| 2007/0174255 A1 | 7/2007 | Sravanapudi et al. | |
| 2007/0226198 A1 | 9/2007 | Kapur | |
| 2007/0294200 A1 | 12/2007 | Au | |
| 2008/0033932 A1 | 2/2008 | DeLong et al. | |
| 2008/0059508 A1 | 3/2008 | Lu et al. | |
| 2008/0104061 A1 | 5/2008 | Rezaei | |
| 2008/0104071 A1 | 5/2008 | Pragada et al. | |
| 2008/0133585 A1 | 6/2008 | Vogel et al. | |
| 2008/0235203 A1 | 9/2008 | Case et al. | |
| 2008/0243779 A1 | 10/2008 | Behnen et al. | |
| 2008/0256061 A1 | 10/2008 | Chang et al. | |
| 2008/0270384 A1 | 10/2008 | Tak | |
| 2008/0288456 A1 | 11/2008 | Omoigui | |
| 2009/0006358 A1 | 1/2009 | Morris et al. | |
| 2009/0006974 A1 | 1/2009 | Harinarayan | |
| 2009/0024962 A1 | 1/2009 | Gotz | |
| 2009/0083261 A1 | 3/2009 | Nagano et al. | |
| 2009/0119261 A1 | 5/2009 | Ismalon | |
| 2009/0125505 A1 | 5/2009 | Bhalotia | |
| 2009/0157419 A1 | 6/2009 | Bursey | |
| 2009/0157676 A1 | 6/2009 | Shanbhag | |
| 2009/0164441 A1 | 6/2009 | Cheyer | |
| 2009/0234814 A1 | 9/2009 | Boerries et al. | |
| 2009/0240672 A1 | 9/2009 | Costello | |
| 2009/0241065 A1 | 9/2009 | Costello | |
| 2009/0254574 A1 | 10/2009 | De et al. | |
| 2010/0023508 A1 | 1/2010 | Zeng et al. | |
| 2010/0049682 A1 | 2/2010 | Chow et al. | |
| 2010/0106485 A1 | 4/2010 | Lu et al. | |
| 2010/0131085 A1 | 5/2010 | Steelberg | |

FOREIGN PATENT DOCUMENTS

| | | |
|---|---|---|
| KR | 10-0837751 | 6/2008 |
| WO | WO 01-50330 | 7/2001 |
| WO | WO2006083684 | 8/2006 |
| WO | WO2007113546 | 10/2007 |
| WO | WO 2007143109 | 12/2007 |
| WO | WO2008027503 | 3/2008 |
| WO | WO2009117273 A2 | 9/2009 |
| WO | WO 2010148419 | 12/2010 |

OTHER PUBLICATIONS

Chirita, Paul-Alexandru, et al., Personalized Query Expansion for the Web—Published Date: Jul. 27, 2007 http://delivery.acm.org/10.1145/1280000/1277746/p7-chirita.pdf?key1=1277746&key2=8684409521&coll=GUIDE&dl=GUIDE&CFID=63203797& CFTOKEN=28379565.

Kules, Bill, et al., Categorizing Web Search Results into Meaningful and Stable Categories Using Fast-Feature Techniques—Published Date: Jun. 15, 2006 http://hcil.cs.umd.edu/trs/2006-15/2006-15.pdf.

Bade, Korinna, et al., CARSA—An Architecture for the Development of Context Adaptive Retrieval Systems—Published Date: Feb. 14, 2006 http://www.springerlink.com/content/jk3wj13251rh6581/fulltext.pdf.

"Batko, Michal, et al., "On Scalability of the Similarity Search in the World of Peers," May 29-Jun. 1, 2006, 12 pages, Proceedings of the First International Conference on Scalable Information Systems, Hong Konghttp://www.nmis.isti.cnr.it/falchi/publications/Falchi-2006-Infoscale.pdf".

Broder, Andrei, et al., A Semantic Approach to Contextual Advertising, Published Jul. 23-27, 2007, http://fontoura.org/papers/semsyn.pdf.

Budanitsky, et al., "Semantics Distance in Wordnet: an experimental, application-oriented evaluation of five measures" workshop of wordnet and other lexical resources, in the north american chapter of the association for computation linguistics, Jun. 2001, Pittsburgh, PA http://citeseer.ist.psu.edu/budanitskyo1semantic.html.

Cuil—Features, Cuil, Inc., Published 2010, http://www.cuil.com/info/features.

Fisher, Brian, et al., "CZWeb: Fish-Eye Views for Visualizing the World-Wide Web", Published 1997, 5 pages, http://scholar.google.co.in/scholar?cluster=3988401955906218135&hl=en&as_sdt=2000.

Gjergji Kasneci, "Searching and Ranking in Entity-Relationship Graphs"—Published Date: Dec. 23, 2009, http://domino.mpi-inf.mpg.de/intranet/ag5/ag5publ.nsf/6a06bf33407d587ec12565dd006fb8de/2c25044ad8d088fdc125763b003d5810/$FILE/gjergji_kasneci_phd.pdf.

Gjergji Kasneci, et al., "NAGA: Searching and Ranking Knowledge"—Published Date: Mar. 2007, http://www.mpi-inf.mpg.de/~ramanath/nagatr.pdf.

Gonen, Bilal, "Semantic Browser", Aug. 2006, 42 pages, University of Georgia, Athens, Georgia, http://citeseerx.ist.psu.edu/viewdoc/download?doi=10.1.1.83.9132&rep=rep1&type=pdf.

Google Wonder Wheel, Google Wonder Wheel Explained, Google Inc., Published 2009, http://www.googlewonderwheel.com.

Hao Liang, et al., "Translating Query for Deep Web Using Ontology", 2008 International Conference on Computer Science and Software Engineering, IEEE Computer Society, Published Date: 2008, http://ieeexplore.ieee.org/stamp/stamp.jsp?arnumber=04722650.

Havre, Susan, et al., "Interactive Visualization of Multiple Query Results," 2001, 8 pages, http://citeseerx.ist.psu.edu/viewdoc/download?doi=10.1.1.91.2850&rep=rep1&type=pdf.

Hearst, Marti A., "Ch. 10, Information Visualization for Search Interfaces", 2009, 65 pages, Search User Interfaces, http://searchuserinterfaces.com/book/sui_ch10_visualization.html.

International Search Report and Written Opinion PCT/US2011/021596, mailed Aug. 29, 2011.

International Search Report and Written Opinion PCT/US2011/021597, mailed Sep. 23, 2011.

Jonker, David, et al., "Information Triage with TRIST", May 2005, 6 pages, 2005 Intelligence Analysis Conference, Washington DC, Oculus Info, Inc., http://www.oculusinfo.com/papers/Oculus_TRIST_Final_Distrib.pdf.

Kiryakov, et al., "Semantic Annotation, Indexing, and Retrieval" Web Semantics: Science, Services and Agents on the World Wide Web, Elsevier, vol. 2, No. 1, Dec. 1, 2004, pp. 49-79.

Kosara, Robert, et al., "An Interaction View on Information Visualization", 2003, 15 pages, The Eurographics Association, http://www.cs.uta.fi/~jt68641/infoviz/An_Interaction_View_on_Information_Visualization.pdf.

Kosmix: Your Guide to the Web, Kosmix Corporation, Published 2010, http://www.kosmix.com/corp/about.

International Search Report and Written Opinion PCT/US2011/020908, mailed Sep. 28, 2011.

Leopold, Jennifer, et al., "A Generic, Functionally Comprehensive Approach to Maintaining an Ontology as a Relational Database", 2009, pp. 369-379, World Academy of Science, vol. 52, http://www.akademik.unsri.ac.id/download/journal/files/waset/v52-58-oaj-unsri.pdf.

Mateevitsi, Victor, et al., "Sparklers: An Interactive Visualization and Implementation of the Netflix recommandation algorithm", retrieved Apr. 7, 2010, 5 pages, http://www.vmateevitsi.com/bloptop/.

Nguyen, Tien N., "A Novel Visualization Model for Web Search Results," Sep./Oct. 2006, pp. 981-988, IEEE Transactions on Visualization and Computer Graphics, vol. 12, No. 5, http://ieeexplore.ieee.org/stamp/stamp.jsp?tp=&arnumber=4015455.

Osinski, Stanislaw, An Algorithm for Clustering of Web Search Results, Published Jun. 2003, http://project.carrot2.org/publications/osinski-2003-lingo.pdf.

Search Report PCT/US2011/0212 mailed Aug. 19, 2011.

Rajaraman, Anand, Kosmix: Exploring the Deep Web Using Taxonomies and Categorization, Published 2009, http://ftp.research.microsoft.com/pub/debull/A09June/anand_deepweb1.pdf.

Roberts, Jonathan C., et al.,"Visual Bracketing for Web Search Result Visualization", 2003, 6 pages, Seventh International Conference on Information Visualization, IEEE Computer Society,http://ieeexplore.ieee.org/stamp/stamp.jsp?tp=&arnumber=1217989.

Smith, Kate A., et al., "Web Page Clustering using a Self-Organizing Map of User Navigation Patterns", Published 2003, pp. 245-256, Decision Support Systems, vol. 35, Elsevier Science, http://citeseerx.ist.psu.edu/viewdoc/download?doi=10.1.1.4.5185&rep=rep1&type=pdf.

Smith, Michael P., et al., "Providing a User Customisable Tool for Software Visualisation at Runtime," Published 2004, 6 pages, University of Durham, United Kingdom, http://citeseerx.ist.psu.edu/viewdoc/download?doi=10.1.1.60.4013&rep=rep1&type=pdf.

Thomas Strang, Claudia Linnhoff-Popien, and Korbinian Frank, "CoOL: A Context Ontology Languageto enable Contextual Interoperability", IFIP International Federation for Information Processing, Published Date: 2003, http://citeseerx.ist.psu.edu/viewdoc/download;jsessionid=BC65BEE5025FB518404AF16988E46489?doi=10.1.1.5.9505&rep=rep1&type=pdf.

Tony Veale and Yanfen Hao, "A context-sensitive framework for lexical ontologies", The Knowledge Engineering Review, vol. 23:1, 101-115, Cambridge University Press, Published Date: 2007, United Kingdom, http://afflatus.ucd.ie/Papers/ContextAndLexicalOntologies.pdf.

Tvarozek, Michal, et a., "Improving Semantic Search via Integrated Personalized Faceted and Visual Graph Navigation", Published Date: 2008, 12 pages, http://www2.fiit.stuba.sk/~bielik/publ/abstracts/2008/sofsem2008navigation.pdf.

U.S. Department of Transportation, Federal Aviation Administration, "The Effect of Loading Parameters on Fatigue of Composite Laminates: Part IV Information Systems"—Published Date: Dec. 2000, http://www.tc.faa.gov/its/worldpac/techrpt/ar00-48.pdf.

Volnyansky, Ilya, "Curse of Dimensionality in the Application of Pivot-based Indexes to the Similarity Search Problem", Published May 2009, 56 pages, University of Ottawa, Canada, http://arxiv.org/PS_cache/arxiv/pdf/0905/0905.2141v1.pdf.

Wang, Xuerui, et al., A Search-Based Method for Forecasting Ad Impression in Contextual Advertising, Published Apr. 20-24, 2009, http://www.cs.umass.edu/~xuerui/papers/forecasting_www2009.pdf.

Yngve, Gary, "Visualization for Biological Models, Simulation, and Ontologies", Published Aug. 2007, 152 pages. University of Washington, http://sigpubs.biostr.washington.edu/archive/00000232/01/gary-thesis-final.pdf.

Zoltan Gyongyi, et al., "Questioning Yahoo! Answers"—Published Date: Apr. 22, 2008, http://infolab.stanford.edu/~zoltan/publications/gyongyi2008questioning.pdf.

Non Final Office Action in U.S. Appl. No. 12/700,980 mailed Nov. 25, 2011.

Non Final Office Action in U.S. Appl. No. 12/700,985 mailed Dec. 12, 2011.

Non Final Office Action in U.S. Appl. No. 12/701,330 mailed Dec. 21, 2011.

Non Final Office Action in U.S. Appl. No. 12/727,836, mailed Jan. 6, 2012.

* cited by examiner

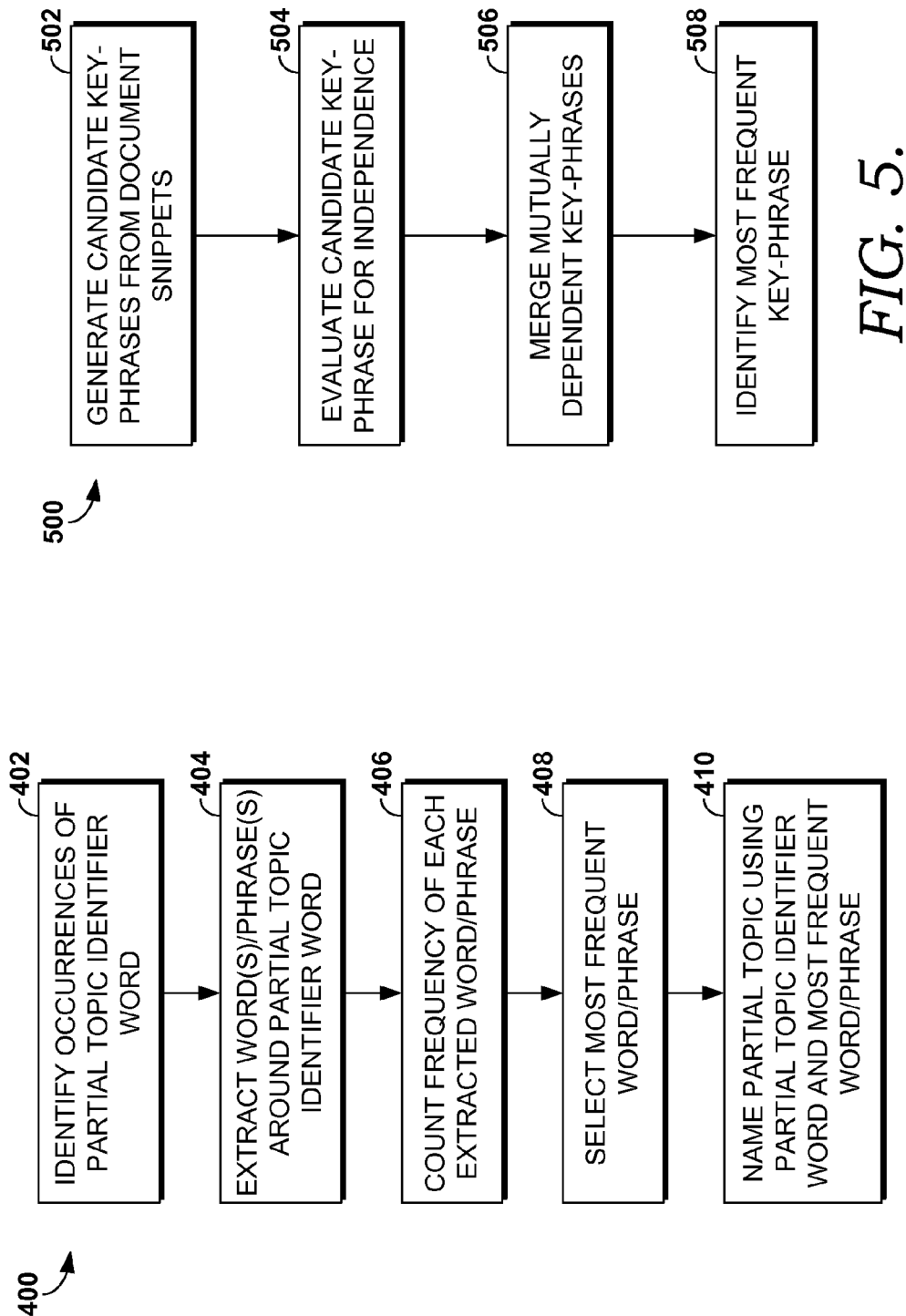

SEMANTIC TABLE OF CONTENTS FOR SEARCH RESULTS

CROSS-REFERENCE TO RELATED APPLICATIONS

This application is related by subject matter to the invention disclosed in the following U.S. patent application filed on even date herewith: U.S. application Ser. No. 12/701,330, entitled "Semantic Advertising Selection from Lateral Concepts and Topics;" which is assigned or under obligation of assignment to the same entity as this application, and incorporated in this application by reference.

BACKGROUND

Although computer systems can store a wealth of information, it can often be difficult for users to find specific information or effectively explore a particular subject area of interest. A variety of search engines currently exist that allow users to search for information by entering a search query comprising one or more keywords that may be of interest to the user. After receiving a search request from a user, a search engine identifies documents and/or web pages that are relevant based on the keywords. Often, the search engine returns a large number of documents or web page addresses, and the user is then left to sift through the list of documents, links, and associated information to find desired information. This process can be cumbersome, frustrating, and time consuming for the user.

A variety of techniques have been employed by search engines in an attempt to assist users in navigating search results and finding relevant documents. One approach is to provide a table of contents (TOC) that includes a list of topics relevant to the search query. A user may select a topic from the TOC and view search results relevant to the selected topic. In some implementations, the TOC remains static as the user selects different topics from the TOC, allowing the user to navigate to different sets of search results within the context of the original search query.

Often, TOCs are manually generated by search engine personnel. In particular, search engine personnel identify top-end queries (i.e., the search queries having the greatest search volumes for the search engine) and manually identify the topics relevant to each search query. However, this approach is very labor intensive, and it would be impractical to manually generate TOCs for torso and tail-end queries (i.e., the search queries having lower search volumes for the search engine). In some instances, a TOC may be algorithmically determined for a search query, for instance, by identifying a domain to which the search query pertains (e.g., auto, finance, etc.) and providing a TOC based on the domain. However, this approach may be ineffective for some search queries. As a result, the TOC provided for some search queries (e.g., torso and tail-end queries) is either non-existent or of very poor quality. This leads to an inconsistent experience for search users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying semantic concepts as topics for inclusion in a table of contents in response to search query. When a search query is received, search results are identified and a table of contents is generated that includes a list of topics for navigating search results. In some embodiments, topics for the table of concepts are identified by analyzing an ontology of topics to identify topics relevant to the search results. In further embodiments, an ontology of partial topics is analyzed to identify relevant partial topics, which are named. In still further embodiments, key-phrases are generated from search results and analyzed to identify key-phrase topics. Identified topics are ranked and selected for inclusion in the table of contents.

BRIEF DESCRIPTION OF THE DRAWINGS

The present invention is described in detail below with reference to the attached drawing figures, wherein:

FIG. 4 is a flow diagram showing a method for naming a partial topic in accordance with an embodiment of the present invention;

FIG. 5 is a flow diagram showing a method for computing independent key-phrases from document snippets in accordance with an embodiment of the present invention.

DETAILED DESCRIPTION

Figure 1:
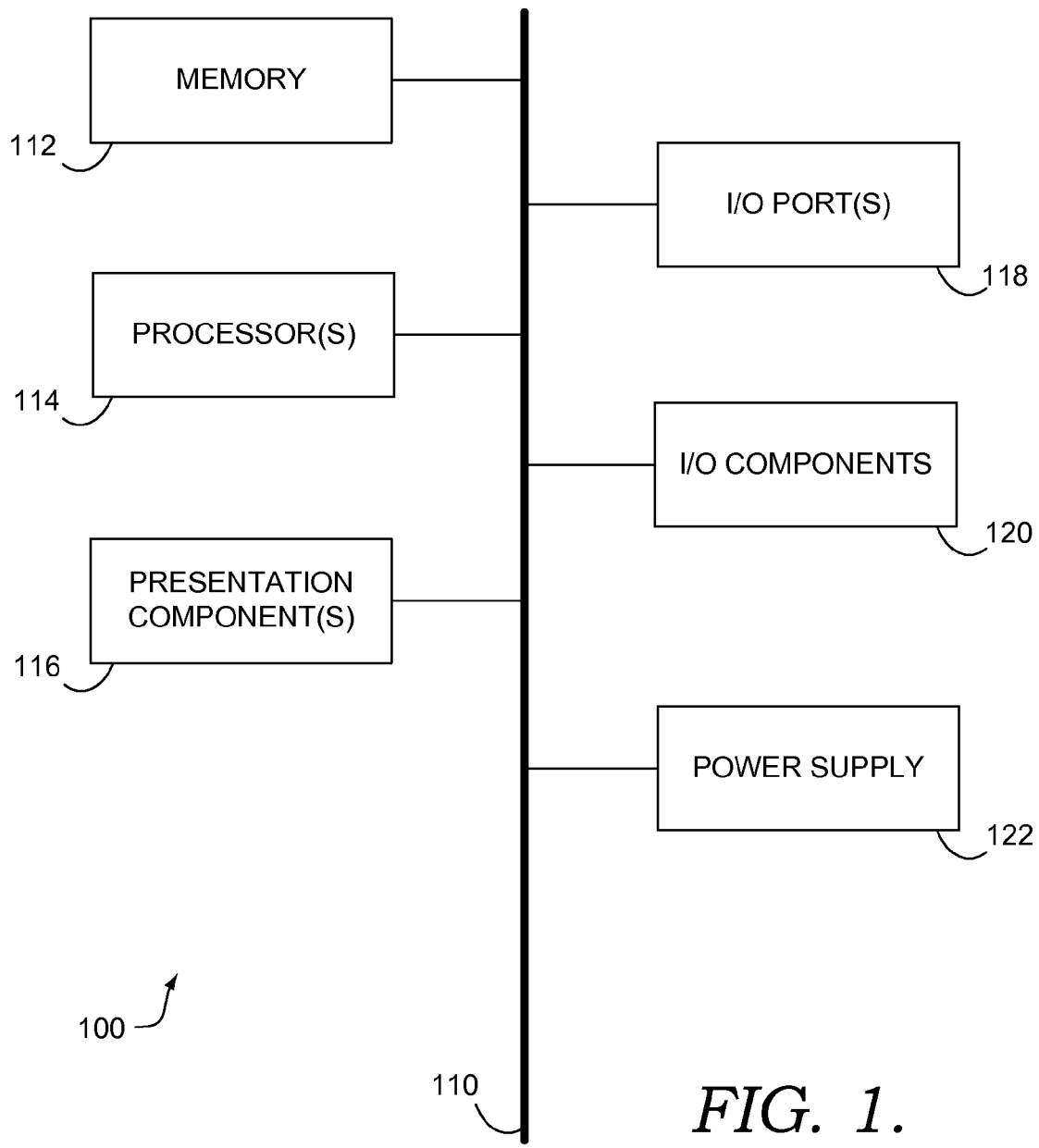
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to generating a table of contents (TOC) for search results in response to a search query. When a search query is received, search results are retrieved. Additionally, topics relevant to the search query and search results are identified, and a TOC is generated from identified topics. A search results page is returned in response to the search query that includes search results and the generated TOC. A user may select topics from the TOC to view different search results relevant to each topic. In some embodiments, the TOC is static as the user selects different topics from the TOC to view different sets of search results, thereby allowing the user to navigate search results within the context of the initial search query.

Topics may be identified for inclusion within a TOC for a search query in a number of different manners within various embodiments of the present invention. In some embodiments, when a search query is received, it is determined whether an ontology mapping already exists for the search query. For instance, a number of topics may have been manually generated for a search query matching the received search query. As another example, a search query matching the received search query may have been previously received and topics previously identified and cached. In such embodiments, topics from the existing ontology mapping are retrieved for the TOC. In further embodiments, search results are retrieved for the search query and compared to an ontology of topics and/or an ontology of partial topics to identify relevant topics. In still further embodiments, search results are analyzed to identify independent key-phrases, and key-phrase topics are selected. When a large number of topics are identified, the topics are ranked, and the highest ranking topics are selected for generating the TOC for the search query.

Accordingly, in one aspect, an embodiment of the present invention is directed to one or more computer-readable media storing computer-useable instructions that, when used by one or more computing devices, cause the one or more computing devices to perform a method. The method includes receiving a search query, performing a search using the search query, and receiving a plurality of documents snippets from the search. The method also includes identifying a first set of one or more candidate topics by comparing one or more document snippets to an ontology of topics. The method further includes identifying a second set of one or more candidate topics by comparing one or more document snippets to an ontology of partial topics. The method also includes identifying a third set of one or more candidate topics by generating key-phrase topics from one or more document snippets. The method further includes ranking candidate topics from the first, second, and third set of candidate topics and selecting one or more topics based on ranking of the candidate topics. The method still further includes providing a search results page in response to the search query, the search results page having a table of contents containing the one or more topics and a search results area for presenting one or more search results.

In another embodiment, an aspect of the invention is directed to one or more computer-readable media storing computer-useable instructions that, when used by one or more computing devices, causes the one or more computing devices to perform a method. The method includes receiving a search query and determining if an ontology mapping exists for the search query. If an ontology mapping exists for the search query, the method includes retrieving a first set of topics based on the ontology mapping and adding the first set of topics to a list of topics. The method also includes performing a search using the search query to obtain a plurality of search results, each search result corresponding with a document snippet, and receiving at least a portion of the document snippets as a document set for further analysis. The method further includes comparing each document snippet in the document set to an ontology of topics. For each document snippet in which positive topic identification is determined, the method includes assigning the document snippet to a corresponding topic and removing the document snippet from the document set. The method also includes adding at least one topic identified from the ontology of topics to the list of topics. The method further includes comparing each document snippet remaining in the document set to an ontology of partial topics. For each document snippet in which positive partial topic identification is determined, the method includes assigning the document snippet to a corresponding partial topic and removing the document snippet from the document set. The method also includes naming at least one partial topic having one or more assigned document snippets and adding at least one named partial topic to the list of topics. The method further includes computing independent key-phrases from document snippets remaining in the document set, assigning documents to independent key-phrases, identifying at least one key-phrase topic, and adding the at least one key-phrase topic to the list of topics. The method further includes ranking topics within the list of topics, selecting topics based on ranking, and generating a table of contents using the selected topics. The method still further includes providing a search results page in response to the search query, the search results page including the table of contents and a search results area for presenting search results.

A further embodiment of the present invention is directed to a method for identifying topics from a set of search results for generating a table of contents for the search results. The method includes receiving a search query, performing a search using the search query, and receiving a plurality of document snippets from the search. The method also includes generating candidate key-phrases from at least a portion of the document snippets. The method further includes evaluating candidate key-phrases for independence, merging mutually dependent candidate key-phrases, and identifying a most frequent candidate key-phrase for each group of mutually dependent key-phrases to generate a plurality of independent key-phrases. The method further includes assigning one or more document snippets to each independent key-phrases. The method still further includes selecting key-phrase topics based on assignment of document snippets to independent key-phrases.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof).

Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
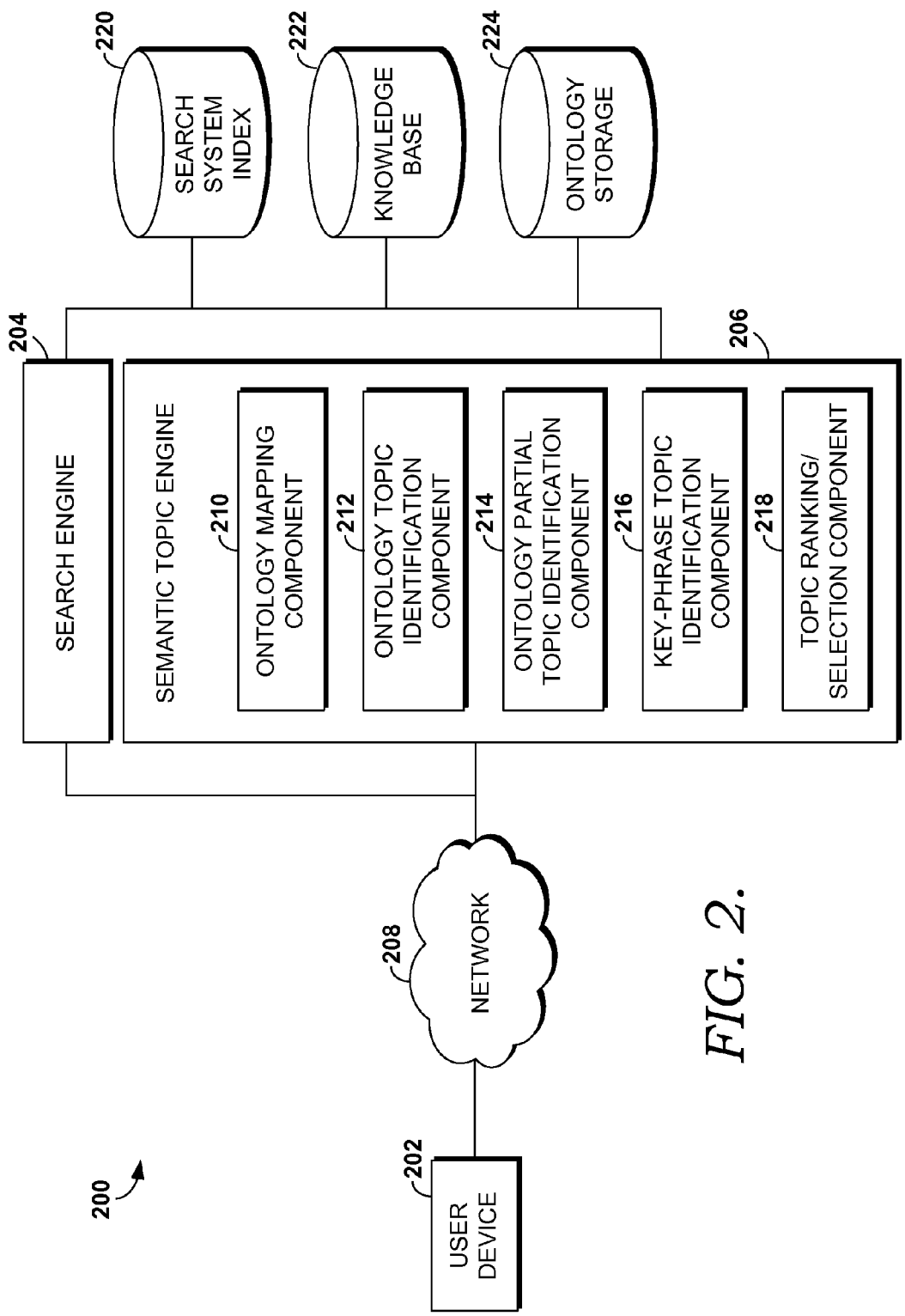
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, a search engine 204, and a semantic topic engine 206. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, search engines, and semantic topic engines may be employed within the system 200 within the scope of the present invention. Each may comprise a single device or multiple devices cooperating in a distributed environment. For instance, the search engine 204 and semantic topic engine 206 may be part of a search system that comprises multiple devices arranged in a distributed environment that collectively provide the functionality of the search engine and semantic topic engine described herein. Additionally, other components not shown may also be included within the system 200.

In embodiments of the present invention, the system 200 includes a search system that comprises, among other components not shown, the search engine 204 and semantic topic engine 206. A user may employ the user device 202 to enter a search query and submit the search query to the search system. For instance, the user may employ a web browser on the user device 202 to access a search input web page of the search system and enter a search query. As another example, the user may enter a search query via a search input box provided by a search engine toolbar located, for instance, within a web browser, the desktop of the user device 202, or other location. One skilled in the art will recognize that a variety of other approaches may also be employed for providing a search query within the scope of embodiments of the present invention.

When the search system receives a search query from a user device, such as the user device 202, the search engine 204 performs a search on a search system index 220, knowledge base 222, and/or other data storage containing searchable content maintained by the search system. The search system index 220 may generally contain unstructured and/or semi-structured data, while the knowledge base 222 may generally contain structured data. Accordingly, the search engine 204 identifies a number of search results in response to the received search query. Additionally, the semantic topic engine 206 operates on the received search query to identify relevant topics for generation of a TOC. In response to the search query, a search results page may be provided to the user device 202 that includes search results with a TOC that includes topics identified by the semantic topic engine 206.

As shown in FIG. 2, the semantic topic engine 206 generally includes an ontology mapping component 210, an ontology topic identification component 212, an ontology partial topic identification component 214, a key-phrase topic identification component 216, and a topic ranking/selection component 218. The semantic topic engine 206 identifies semantic topics employing any of components 210, 212, 214, and 216. In some embodiments of the present invention, each of the components 210, 212, 214, and 216 may be employed to identify topics for a given search query, and the identified topics may be ranked and certain topics selected by the ranking/selection component 218 for inclusion in the TOC. In other embodiments, topics may be identified by only a portion of the components 210, 212, 214, and 216. For instance, in one embodiment, once a threshold number of topics are identified by one or more of components 210, 212, 214, 216, further analysis by remaining components is not performed. In further embodiments, the semantic topic engine 206 may include only a portion of the components 210, 21, 214, and 216 shown in FIG. 2. Any and all such variations are contemplated to be within the scope of embodiments of the present invention.

When a search query is received from a user device, such as the user device 202, the ontology mapping component 210 operates to identify whether an ontology mapping already exists for the search query. For instance, the search query may be a top-end search query for which search system personnel have manually identified relevant topics for a TOC for the search query. As another example, the received search query may correspond with a search query for which relevant topics have already been identified and cached for the search query. If the ontology mapping component 210 determines that an ontology mapping already exists for a received search query, topics are retrieved based on the ontology mapping. In some embodiments, a TOC is generated based only on the topics retrieved by the ontology mapping component 210. In other embodiments, additional topics are identified by one or more of the other components 212, 214, and 216, as described in further detail below.

The ontology topic identification component 212 operates on a received search query in conjunction with an ontology of topics stored in the ontology storage component 224 to identify relevant topics for the search query. The ontology storage component 224 may store one or more ontologies, which are used by the ontology topic identification component 212 to identify semantic concepts as topics for received search queries. Each ontology includes a collection of words and phrases defining concepts and relationships between the concepts. In some embodiments, a search is performed on the search system index 220 and/or knowledge base 222 to retrieve search results for the search query, and the ontology topic identification component 212 analyzes the search results in conjunction with the ontology of topics to identify relevant topics for possible inclusion in a TOC for the search query.

The ontology partial topic identification component 214 functions in a manner similar to the ontology topic identification component 212 but uses an ontology of partial topics instead of an ontology to topics. As used herein, a partial topic refers to partially-named topics. Each partial topic includes a partial topic identifier word that may be combined with an additional word or phrase to create a topic for use in a TOC. For example, "reviews" may be a partial topic. When analyzed in context, the partial topic identifier word "reviews" may be combined with additional words, such as, "expert" or "user" to generate the topics "expert reviews" or "user reviews." Accordingly, once partial topics are identified for a search query, the ontology partial topic identification component 214 or an associated component names the partial topic for possible inclusion in a TOC for the search query.

The key-phrase topic identification component 216 analyzes search results for a received search query to generate candidate key-phrases. Generally, the key-phrase topic identification component 216 generates key-phrases from search results and identifies independent key-phrases. The independent key-phrases are evaluated to identify candidate topics for possible inclusion in a TOC for the search query.

A number of topics may be identified for a received search query by the ontology mapping component 210, ontology topic identification component 212, ontology partial topic identification component 214, and/or key-phrase topic identification component 216. In some instances, all identified topics may be included in the TOC provided on a search results page in response to the search query. In other instances, a large number of topics may be identified, and only a subset of the identified topics is included in the TOC.

The topic ranking/selection component 218 operates to rank and select topics for inclusion in the TOC. Topics may be ranked using a number of different factors in accordance with various embodiments of the present invention. By way of example only and not limitation, each topic may be ranked based on the total number of documents assigned to each topic. A larger number of documents assigned to a given topic may provide a higher ranking for the topic. A topic may also be ranked based on the ranking of each search result (or a selection of search results—e.g., the top N search results) assigned to the topic. The ranking of each search result corresponds with each search result's relevance to the search query. Accordingly, more highly relevant search results being assigned to a given topic may provide a higher ranking for the topic. The length (e.g., number of words) of each topic may further be used to rank the topics. Any and all such variations are contemplated to be within the scope of embodiments of the present invention. After ranking the candidate topics, the topic ranking/selection component 216 selects topics for the TOC.

Figure 3A:
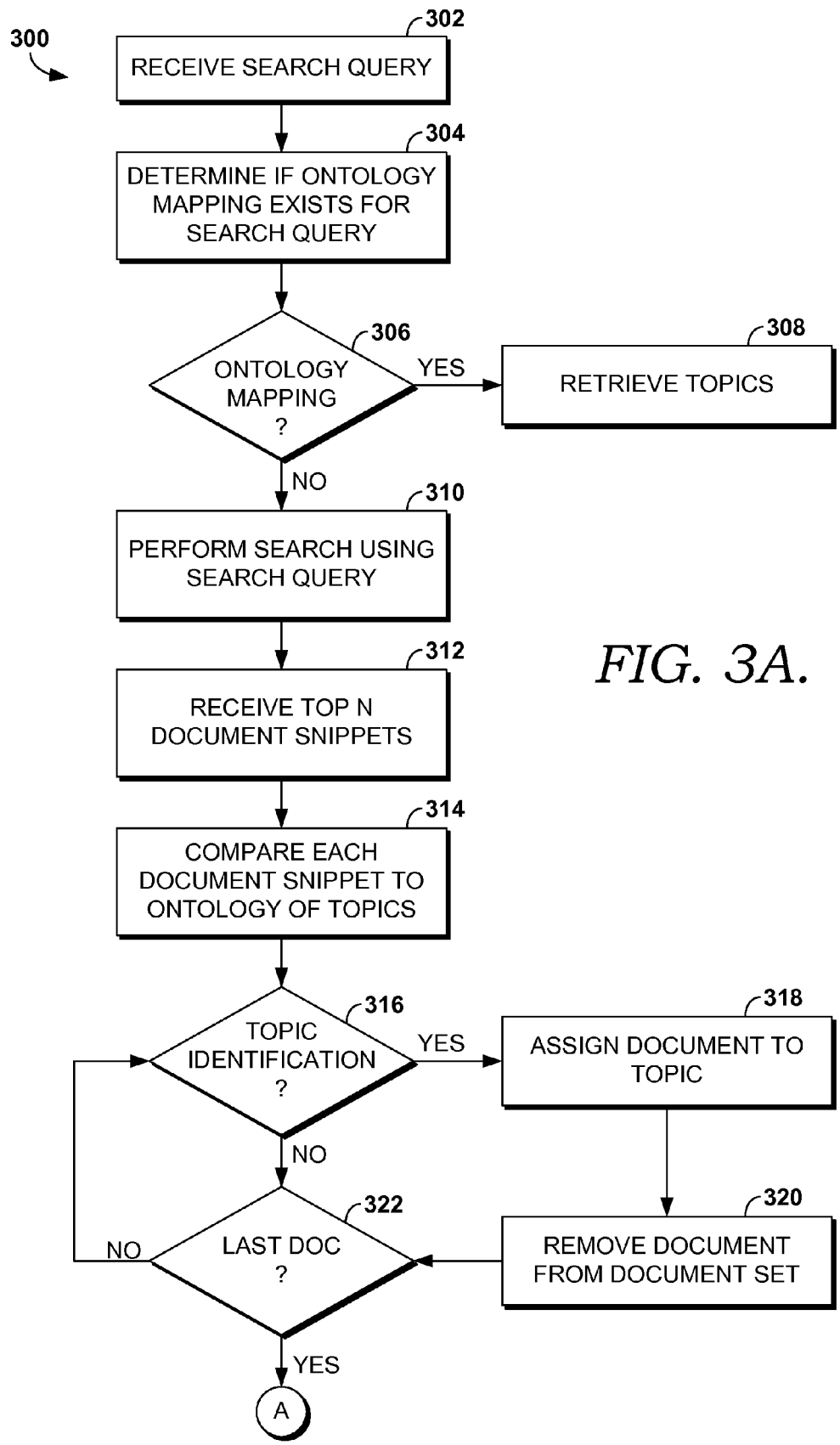
FIG. 3 is a flow diagram showing a method for identifying topics and generating a table of contents for a search query in accordance with an embodiment of the present invention.
Figure 3B:
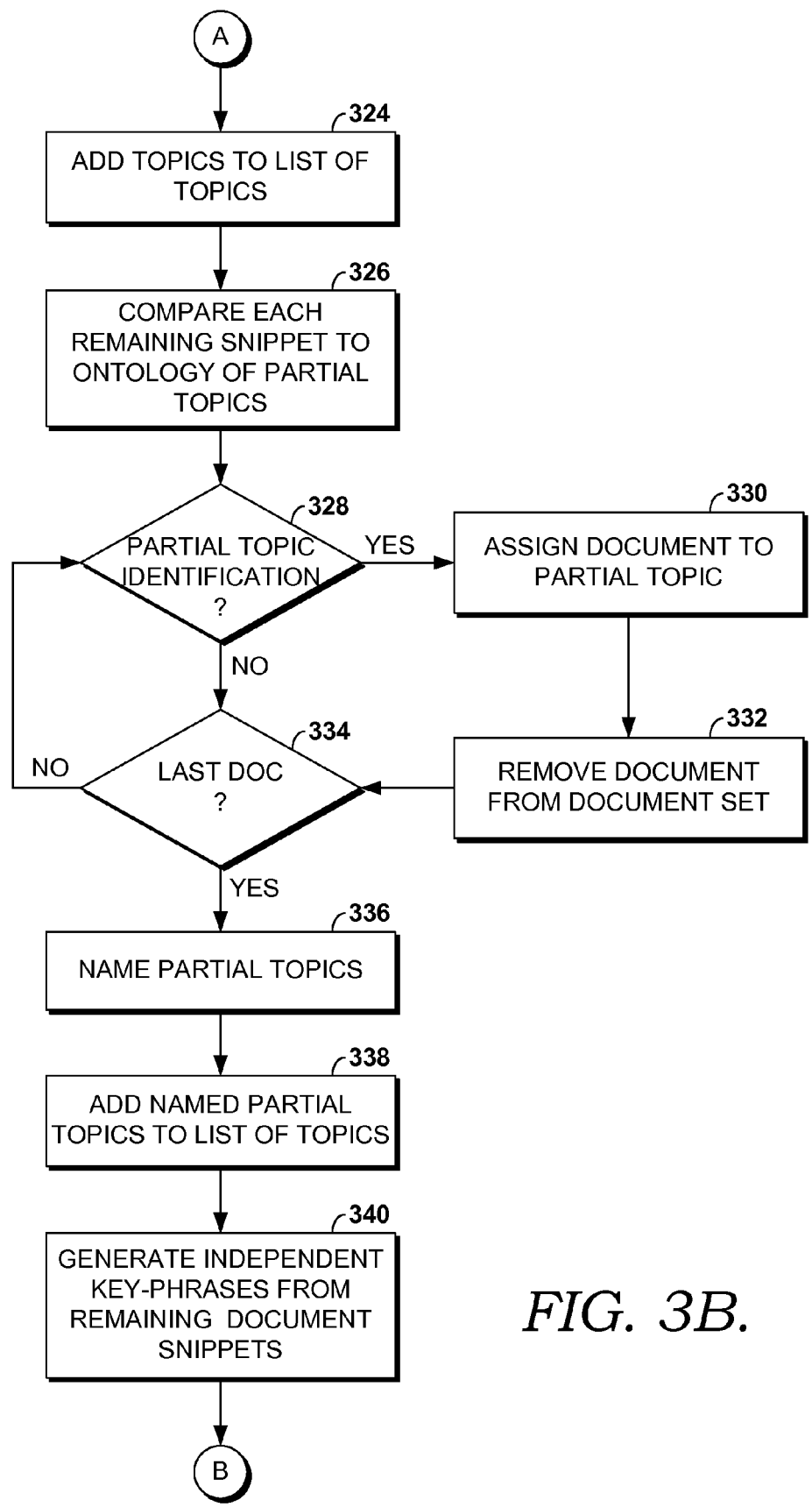
Figure 3C:
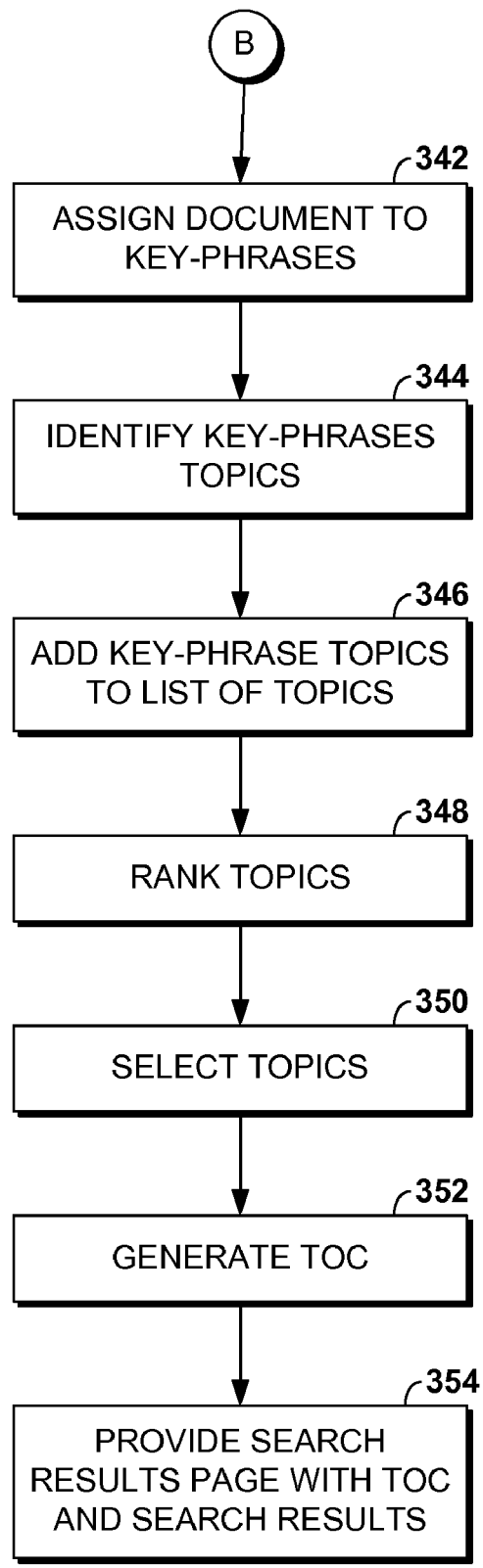

Turning to FIG. 3, a flow diagram is provided that illustrates a method 300 for generating a TOC for a search query received at a search system in accordance with an embodiment of the present invention. As shown at block 302, a search query is received. As one skilled in the art will recognize, the search query may comprise one or more search terms entered by a user (although search terms may be automatically provided in some embodiments). Additionally, the search query may be provided in a number of different ways. By way of example only and not limitation, a user may employ a web browser to navigate to a search engine web page and enter the search query in an input box. As another example, a user may enter the search query in an input box provided by a search engine toolbar located, for instance, within a web browser, the desktop of the user's computing device, or other location. One skilled in the art will recognize that a variety of other approaches may also be employed for providing a search query within the scope of embodiments of the present invention.

In accordance with the embodiment shown in FIG. 3, a determination is made at block 304 regarding whether an ontology mapping already exists for the search query. For instance, the search query may be a top-end search query for which search system personnel have manually identified relevant topics for the search query. Alternatively, the received search query may correspond with a search query that has been previously processed by the search system to identify relevant topics, and the search system may have cached the identified topics for the search query. If it is determined that an ontology mapping already exists at block 306, topics for the search query are retrieved at block 308. In some embodiments, only the topics retrieved at block 308 are used for generating the TOC in response to the search query and the process ends. In such embodiments, a search page is generated that includes a TOC generated from the topics retrieved at block 308. In other embodiments, the process continues at block 310, and additional topics are algorithmically identified.

If it is determined at block 306 that an ontology mapping does not exist for the search query (or if the process continues after retrieving topics at block 308), a search is performed using the search query, as shown at block 310. Search results for the search query are returned, and the top N document snippets from the search are received at block 312 as a document set to be analyzed.

As shown at block 314, each document snippet in the document set is compared to an ontology of topics (or a collection of ontologies) to identify whether each document snippet maps to a topic in the ontology. Identifying a document snippet as being associated with a topic in the ontology of topics may be performed in a number of different manners within the scope of embodiments of the present invention. By way of example only and not limitation, in one embodiment, a document snippet is converted to a feature vector based on words contained in the document snippet, and the feature vector is compared to topics in the ontology to determine distance of the feature vector to the topics. Positive topic identification is determined for a given document snippet by determining that the feature vector for the document snippet is within a predetermined distance of a given topic. If topic identification is positive for a given document snippet at block 316 based on analysis of the document snippet and ontology, the document snippet is assigned to the identified topic, as shown at block 318. Additionally, the document snippet is removed from the document set at block 320.

After identifying a relevant topic for a given document snippet (e.g., via blocks 316-320) or determining that no topic from the ontology is sufficiently relevant for the document snippet (e.g., via block 316), a determination is made at block 322 regarding whether the document snippet analyzed was the last document snippet in the document set to be analyzed. If additional document snippets remain for analysis, the process of blocks 316-322 is repeated until all document snippets in the document set have been compared to the ontology of topics. After all document snippets in the document set have been compared to the ontology of topics, topics identified from the ontology of topics are added to a list of candidate topics for consideration, as shown at block 324. In some embodiments, all identified topics are added to the list. In other embodiments, only a portion of the topics are added. For instance, in some embodiments, only topics having a predetermined number of assigned document snippets are added to the list of topics.

As shown at block 326, each remaining document snippet in the document set is compared to an ontology of partial topics (or a collection of ontologies). As indicated above, a partial topic is a topic that is only partially-named. Each partial topic includes a partial topic identifier word that may be combined with an additional word or phrase to create a topic for use in a TOC.

Whether a given document snippet is associated with a partial topic in the ontology of partial topics is determined at block 328. Identifying a document snippet as being associated with a partial topic may be performed in a number of different manners within the scope of embodiments of the present invention. By way of example only and not limitation, in one embodiment, a document snippet is converted to a feature vector based on words contained in the document snippet, and the feature vector is compared to partial topics in the ontology of partial topics to determine distance of the feature vector to the partial topics. Positive partial topic identification is determined for a given document snippet by determining that the feature vector for the document snippet is within a predetermined distance of a given partial topic. If partial topic identification is positive for a given document snippet at block 328 based on analysis of the document snippet and the ontology of partial topics, the document snippet is assigned to the identified partial topic, as shown at block 330. Additionally, the document snippet is removed from the document set at block 332.

After identifying a relevant partial topic for a given document snippet (e.g., via blocks 328-332) or determining that no partial topic from the ontology is sufficiently relevant for a given document snippet (e.g., via block 328), a determination is made at block 334 regarding whether the document snippet analyzed was the last document snippet in the document set to be analyzed. If additional document snippets remain for analysis, the process of blocks 328-334 is repeated until all document snippets in the document set have been compared to the ontology of partial topics.

After each document snippet remaining in the document set has been compared against the ontology of partial topics, partial topics are named at block 336. In some embodiments, all identified partial topics are named. In other embodiments, only a portion of the topics are named and others are not considered for further analysis. For instance, in some embodiments, only partial topics having a predetermined number of assigned document snippets are named and considered for further analysis. A flow diagram is provided in FIG. 4 that illustrates a method 400 for naming a partial topic in accordance with an embodiment of the present invention. As shown at block 402, occurrences of the partial topic identifier word within the document snippets assigned to the partial topic are identified. For instance, the partial topic identifier word may be "reviews," and each occurrence of that term in the document snippets is identified. At block 404, one or more words and/or phrases around the partial topic identifier word are extracted. The frequency of each extracted word and/or phrase is counted, as shown at block 406. In some embodiments, the location of each extracted word and/or phrase with respect to the partial topic identifier word is tracked and counted. In particular, a word or phrase may appear before or after the partial topic identifier word. The search system may separately track how many times each word and/or phrase appears before the partial topic identifier word and how many times each word and/or phrase appears after the partial topic identifier word.

After each document snippet has been analyzed, the most frequently used word or phrase is selected, as shown at block 408. Additionally, the partial topic is named using the partial topic identifier word and the most frequently used word or phrase, as shown at block 410. The sequencing of the partial topic identifier word and the most frequently used word or phrase may be determined based on the majority ordering in the analyzed text of the document snippets. For instance, if the selected word or phrase occurred before the partial topic identifier word more often than after the partial topic identifier word, the sequence for the partial topic name will include the selected word or phrase first followed by the partial topic identifier word. Returning to FIG. 3, named partial topics are added to the list of topics, as shown at block 338.

Independent key-phrases are generated at block 340 from the document snippets remaining in the document set after comparison of the documents snippets to the ontology of topics and the ontology of partial topics. Referring to FIG. 5, a flow diagram is provided that illustrates a method 500 for computing independent key-phrases from the remaining document snippets in accordance with an embodiment of the present invention. As shown at block 502, candidate key-phrases are generated from the document snippets remaining in the document set. In accordance with some embodiments of the present invention, a Markov chain based method is used to generate the candidate key-phrases.

Candidate key-phrases are evaluated for independence, as shown at block 504. Independence of candidate key-phrases may be evaluated using a number of metrics in accordance with embodiments of the present invention. For instance, independence may be determined based on any combination of the following metrics: the number of words shared between the candidate key-phrases, analysis of acronyms of words in the key-phrases, and the number of documents shared by candidate key-phrases.

For each group of mutually dependent key-phrases, the mutually dependent key-phrases are merged at block 506. As such, the most frequent key-phrase from a group of mutually dependent key-phrases is selected as a key-phrase for further analysis, as shown at block 508. The process of merging mutually dependent key-phrases to identify key-phrases for further analysis is repeated until no more mutually dependent key-phrases remain. The result of the method 500 is a collection of one or more independent key-phrases that may be further evaluated as possible topics.

Referring again to FIG. 3, after identifying candidate topics from independent key-phrases, document snippets remaining in the document set are assigned to the key-phrase topics, as shown at block 342. Identifying a document snippet as being associated with a key-phrase may be performed in a number of different manners within the scope of embodiments of the present invention. By way of example only and not limitation, in one embodiment, a document snippet is converted to a feature vector based on words contained in the document snippet, and the feature vector is compared to key-phrases to determine distance of the feature vector to the key-phrases. Positive key-phrase identification is determined for a given document snippet by determining that the feature vector for the document snippet is within a predetermined distance of a given key-phrase. Key-phrase topics are identified as shown at block 344 and added to the list of topics at block 346. In some embodiments, all independent key-phrases are identified as key-phrase topics and added to the list of topics. In other embodiments, only a portion of the key-phrases are recognized as topics are added to the list of topics. For instance, in some embodiments, only key-phrases having a predetermined number of assigned document snippets are identified as key-phrase topics and added to the list of topics.

A list of candidate topics is provided as a result of the above-described process and may include topics identified from an existing ontology mapping, analysis of an ontology of topics, analysis of an ontology of partial topics, and/or key-phrase generation. In some instances, a larger number of topics may have been identified than is desired for the TOC. As such, the process continues by ranking and selecting topics for inclusion in the TOC. As shown at block 348, the candidate topics are ranked. Candidate topics may be ranked using a number of different factors in accordance with various embodiments of the present invention. By way of example only and not limitation, each candidate topic may be ranked based on the total number of documents assigned to each candidate topic. A larger number of documents assigned to a given candidate topic may provide a higher ranking for the candidate topic. A candidate topic may also be ranked based on the ranking of each document (or a selection of documents—e.g., the top N documents) assigned to the candidate topic. The ranking of each document corresponds with each document's relevance to the search query. Accordingly, more highly relevant documents being assigned to a given candidate topic may provide a higher ranking for the candidate topic. The length (e.g., number of words) of each candidate topic may further be used to rank the candidate topics. Any and all such variations are contemplated to be within the scope of embodiments of the present invention.

As shown at block 350, topics are selected from the list of candidate topics based on ranking for inclusion in the TOC to be provided in conjunction with search results in response to the search query. In some embodiments, a predetermined number of topics is selected. For instance, the search system may select the five topics with the highest ranking. In other embodiments, all topics having a ranking satisfying a predetermined or dynamic threshold may be selected. In further embodiments, topics having a significantly higher ranking than other topics are selected. Any combination of the above and/or additional approaches to selecting topics based on ranking may be employed within embodiments of the present invention.

A TOC is generated based on the selected topics, as shown at block 352. Additionally, a search results page is generated at block 354 and returned to the user who submitted the search query. In accordance with an embodiment of the present invention, the search results page includes a listing of search results for the search query. Additionally, the search results page includes the TOC that includes the topics selected at block 350. The TOC may be presented in a side panel adjacent to the search results or in another portion of the search results page.

Figure 6:
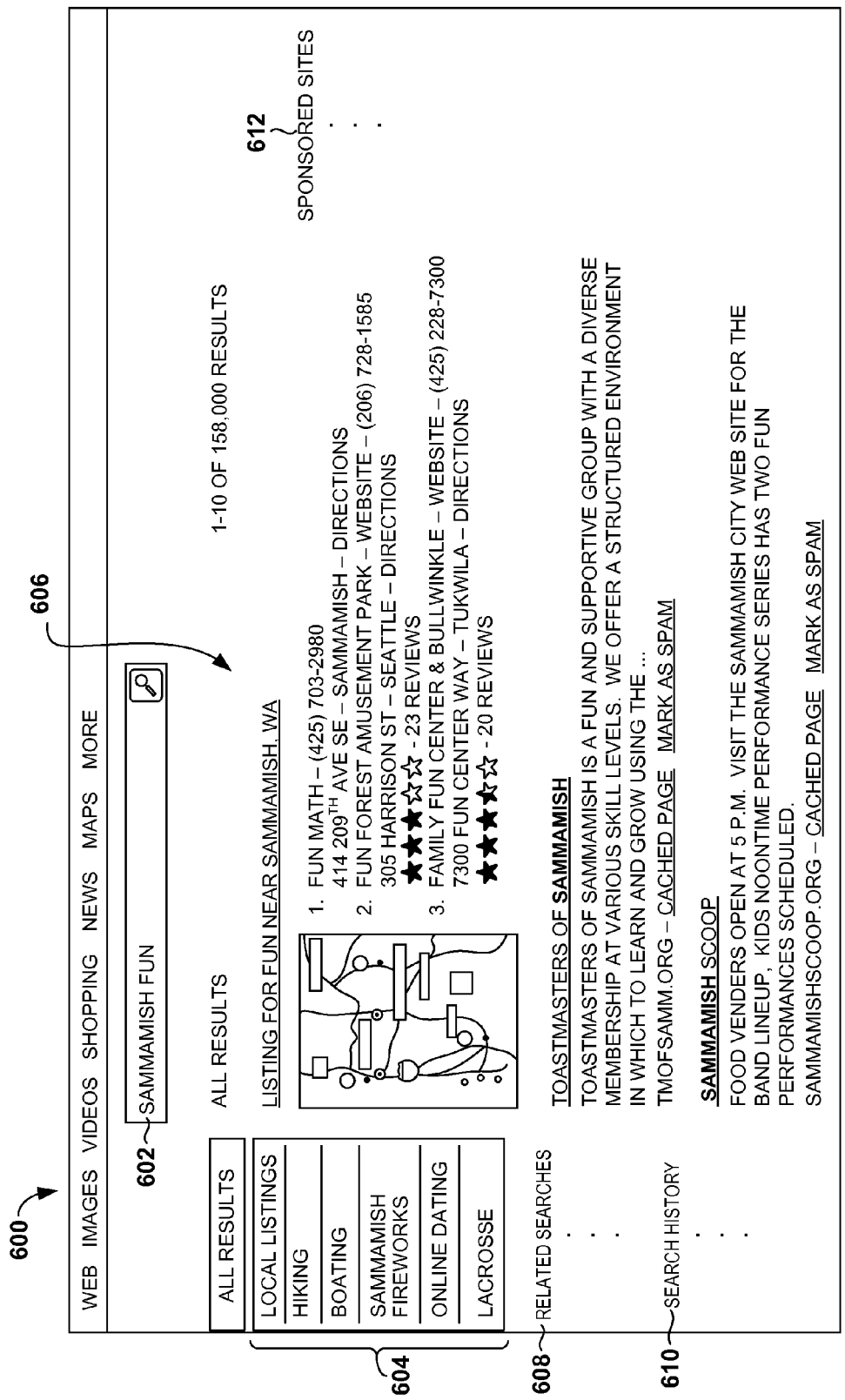
FIG. 6 is an illustrative screen display showing a search results page having a table of contents generated in accordance with an embodiment of the present invention.

By way of illustration, FIG. 6 includes an exemplary screen display showing a search results page 600 including a TOC generated in accordance with an embodiment of the present invention. It will be understood and appreciated by those of ordinary skill in the art that the screen display of FIG. 6 is provided by way of example only and is not intended to limit the scope of the present invention in any way.

As shown in FIG. 6, the search results page 600 has been provided in response to the search query 602, "sammamish fun." In response to the search query 602, the search results page 600 includes a TOC 604 in left-side pane. The TOC 604 includes the following topics: Local Listings, Hiking, Boating, Sammamish Fireworks, Online Date, and Lacrosse. The topics included in the TOC 604 are semantic concepts identified for the search query based on analysis of ontological entities and concepts and key-phrase extraction as discussed herein. The search results page 600 also includes a search results area 606 for displaying search results relevant to the search query 602. In the screen display of FIG. 6, "All Results" are currently being displayed in the search results area 606. If a user selects a topic from the TOC 604, search results relevant to the selected topic would be displayed in the search results area 606. As shown in FIG. 6, the search results page may include further features, such as, for instance, related search queries 608, search history 610, and sponsored sites 612. Details of these sections have been omitted from the search results page 600 for clarify purposes.

As can be understood, embodiments of the present invention identify semantic concepts as topics for generation of a TOC for search results. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media storing computer-useable instructions that, when used by one or more computing devices, cause the one or more computing devices to perform a method comprising:

receiving a search query;
performing a search using the search query;
receiving a plurality of documents snippets from the search;
identifying a first set of one or more candidate topics by comparing one or more document snippets to an ontology of topics;
identifying a second set of one or more candidate topics by comparing one or more document snippets to an ontology of partial topics;
identifying a third set of one or more candidate topics by generating key-phrase topics from one or more document snippets, wherein identifying the third set of one or more candidate topics includes computing independent key-phrases from document snippets remaining in the document set by:
generating candidate key-phrases from one or more document snippets, evaluating candidate key-phrases for independence, merging mutually dependent candidate key-phrases, and identifying a most frequent candidate key-phrase for each group of merged mutually dependent key-phrases;
ranking candidate topics from the first, second, and third set of candidate topics;
selecting one or more topics based on ranking of the candidate topics; and
providing a search results page in response to the search query, the search results page having a table of contents containing the one or more topics and a search results area for presenting one or more search results.

2. The one or more computer-readable media of claim 1, wherein identifying the second set of one or more candidate topics by comparing one or more document snippets to the ontology of partial topics comprises identifying one or more partial topics and naming each partial topic, wherein a partial topic is named by:
identifying occurrences of a partial topic identifier word for the partial topic within one or more document snippets;
extracting words and/or phrases occurring around identified occurrences of the partial topic identifier word within the one or more document snippets;
counting frequency of each extracted word and/or phrase;
selecting a most frequently used word or phrase; and
naming the partial topic using the partial topic identifier and the most frequently used word or phrase.

3. The one or more computer-readable media of claim 1, wherein ranking a candidate topic is based on one or more selected from the following: a total number of documents assigned to the candidate topic; ranking of each document assigned to the candidate topic; ranking of a selection of documents assigned to the topic; and a word length of the candidate topic.

4. The one or more computer-readable media of claim 1, wherein selecting one or more topics based on ranking of the candidate topics comprises one or more selected from the following: selecting a predetermined number of topics; selecting all topics having a ranking satisfying a predetermined threshold; and selecting topics having a significantly higher relevance than other topics.

5. One or more computer-readable media storing computer-useable instructions that, when used by one or more computing devices, cause the one or more computing devices to perform a method comprising:
receiving a search query;
determining an ontology mapping exists for the search query;
if an ontology mapping exists for the search query, retrieving (308) a first set of topics based on the ontology mapping and adding the first set of topics to a list of topics;
performing a search using the search query to obtain a plurality of search results, each search result corresponding with a document snippet;
receiving at least a portion of the document snippets as a document set for further analysis;
comparing each document snippet in the document set to an ontology of topics;
for each document snippet in which positive topic identification is determined, assigning the document snippet to a corresponding topic and removing the document snippet from the document set;
adding at least one topic identified from the ontology of topics to the list of topics;
comparing each document snippet remaining in the document set to an ontology of partial topics;
for each document snippet in which positive partial topic identification is determined, assigning the document snippet to a corresponding partial topic and removing the document snippet from the document set;
naming at least one partial topic having one or more assigned document snippets;
adding at least one named partial topic to the list of topics;
computing independent key-phrases from document snippets remaining in the document set, wherein computing the independent key-phrases from document snippets remaining in the document set comprises:
generating candidate key-phrases from the document snippets remaining the document set, evaluating candidate key-phrases for independence, merging mutually dependent candidate key-phrases, and identifying a most frequent candidate key-phrase for each group of merged mutually dependent key-phrases;
assigning documents to independent key-phrases;
identifying at least one key-phrase topic;
adding the at least one key-phrase topic to the list of topics;
ranking topics within the list of topics;
selecting topics based on ranking;
generating a table of contents using the selected topics; and
providing a search results page in response to the search query, the search results page including the table of contents and a search results area for presenting search results.

6. The one or more computer-readable media of claim 5, wherein receiving at least a portion of the document snippets as the document set for further analysis comprises receiving document snippets corresponding with a predetermined number of search results having the highest relevance to the search query.

7. The one or more computer-readable media of claim 5, wherein comparing each document snippet in the document set to the ontology of topics comprises computing a feature vector for each document snippet based on words contained in each document snippet and comparing each feature vector to topics in the ontology of topics, and wherein positive topic identification for a document snippet is determined by determining that the feature vector for the document snippet is within a predetermined distance of a given topic.

8. The one or more computer-readable media of claim 5, wherein adding at least one topic identified from the ontology of topics to the list of topics comprises adding each topic having greater than a predetermined number of assigned document snippets.

9. The one or more computer-readable media of claim 5, wherein comparing each document snippet remaining in the document set to the ontology of partial topics comprises computing a feature vector for each document snippet based on words contained in each document snippet and comparing each feature vector to partial topics in the ontology of partial topics, and wherein positive partial topic identification for a document snippet is determined by determining that the feature vector for the document snippet is within a predetermined distance of a given partial topic.

10. The one or more computer-readable media of claim 5, wherein naming at least one partial topic having one or more assigned document snippets comprises naming each partial topic having greater than a predetermined number of assigned document snippets.

11. The one or more computer-readable media of claim 5, wherein naming a partial topic comprises:
    identifying occurrences of a partial topic identifier word for the partial topic within one or more document snippets assigned to the partial topic;
    extracting words and/or phrases occurring around identified occurrences of the partial topic identifier word within the one or more document snippets;
    counting frequency of each extracted word and/or phrase;
    selecting a most frequently used word or phrase; and
    naming the partial topic using the partial topic identifier and the most frequently used word or phrase.

12. The one or more computer-readable media of claim 11, wherein counting frequency of each extracted word and/or phrase comprises tracking position of each extracted word and/or phrase relative to the partial topic identifier word, and wherein naming the partial topic comprises sequencing the partial topic identifier word and the most frequently used word or phrase based on position information for the most frequently used word or phrase.

13. The one or more computer-readable media of claim 5, wherein identifying at least one key-phrase topic comprises identifying each key-phrase having greater than a predetermined number of assigned document snippets as a key-phrase topic.

14. The one or more computer-readable media of claim 5, wherein ranking a topic is based on one or more selected from the following: a total number of documents assigned to the topic; ranking of each document assigned to the topic; ranking of a selection of documents assigned to the topic; and a word length of the topic.

15. The one or more computer-readable media of claim 5, wherein selecting topics based on ranking comprises one or more selected from the following: selecting a predetermined number of topics; selecting all topics having a ranking satisfying a predetermined threshold; and selecting topics having a significantly higher relevance than other topics.

16. A method for identifying topics from a set of search results for generating a table of contents for the search results, the method comprising:
    receiving a search query;
    performing a search using the search query;
    receiving a plurality of document snippets from the search;
    generating candidate key-phrases from at least a portion of the document snippets;
    evaluating candidate key-phrases for independence;
    merging mutually dependent candidate key-phrases;
    identifying a most frequent candidate key-phrase for each group of mutually dependent key-phrases to generate a plurality of independent key-phrases;
    assigning one or more document snippets to each independent key-phrases; and
    selecting key-phrase topics based on assignment of document snippets to independent key-phrases.

17. The method of claim 16, wherein a Markov chain based method is used to generate the candidate key-phrases.

18. The method of claim 16, wherein independence of candidate key-phrases is evaluated using one or more selected from the following: number of words shared by candidate key-phrases, analysis of acronyms of words in candidate key-phrases; and number of documents shared by candidate key-phrases.

* * * * *